United States Patent [19]
Edwards et al.

[11] Patent Number: 6,125,105
[45] Date of Patent: Sep. 26, 2000

[54] METHOD AND APPARATUS FOR FORECASTING FUTURE VALUES OF A TIME SERIES

[75] Inventors: Timothy John Edwards, Herts; Jonathon Coward, Essex; Peter Hamer, Herts; Kevin John Twitchen, Herts; Phillip William Hobson, Herts, all of United Kingdom

[73] Assignee: Nortel Networks Corporation, Canada

[21] Appl. No.: 08/869,900

[22] Filed: Jun. 5, 1997

[51] Int. Cl.[7] .................................. H04J 1/16; H04J 3/16; H04L 12/28; G06F 15/18
[52] U.S. Cl. ........................ 370/230; 370/255; 370/468; 706/22
[58] Field of Search .................................. 370/255, 229, 370/254, 230, 232, 234, 235, 252, 351, 395, 397, 465, 468; 395/25; 364/148.03; 706/6, 15, 26, 22, 20, 25, 40, 34

[56] References Cited

U.S. PATENT DOCUMENTS

| | | | |
|---|---|---|---|
| 5,354,957 | 10/1994 | Robertson | 187/247 |
| 5,793,976 | 8/1998 | Chen et al. | 370/351 |
| 5,812,526 | 9/1998 | Chang et al. | 370/230 |
| 5,818,815 | 10/1998 | Carpentier et al. | 370/395 |
| 5,854,899 | 12/1998 | Callon et al. | 370/235 |
| 5,898,673 | 4/1999 | Riggan et al. | 370/237 |
| 5,956,702 | 9/1999 | Matsuoka et al. | 706/22 |

OTHER PUBLICATIONS

Amir Sarajedini & Paul M. Chau, Quality of Service Prediction using Neural Networks, IEEE, 1996.

G Dorffner, "Neural Networks for Time Series Processing", IDG 1996, pp. 447–468.

S Chong, S Li and J Ghosh, "Predictive Dynamic Bandwidth Allocation for Efficient Transport of Real–Time VBR Video over ATM", IEEE Journal on Selected Areas on Communications, vol. 13, No. 1, Jan. 1995, pp. 12–23.

Z Fan and P Mars, "ATM Traffic Prediction Using FIR Neural Networks", School of Engineering, University of Durham, UK, pp. 34/1–34/10.

F Takens, "Detecting Strange Attractors in Turbulence", Comm Math Phys (1971), vol. 20, pp. 167–192.

Ricardo Mañé, "On the Dimension of the Compact Invariant Sets of Certain Non–Linear Maps", preprint IMPA, Rio de Janeiro 1980.

Richard Rohwer "The Time Dimension of Neural Network Models", SIGART Bulletin, vol. 5, No. 3, pp. 36–44.

J–C Chappelier and A Grumbach, "Time in Neural Networks", SIGART Bulletin, vol. 5, No. 3, pp. 3–11.

Zaiyong Tang, Chrys de Almeida and Paul A Fishwick, "Time Series Forecasting Using Neural Networks vs Box–Jenkins Methodology", Nov. 1991, Simulation, pp. 313–310.

Eric A Wan, "Time Series Prediction by Using a Connectionist Network with Internal Delay Lines", In Time Series Prediction. Forecasting the Future and Understanding the Past, Eds A Weigend and N Gershenfeld, SFI Studies in the Sciences of Complexity, Proc. vol. XVII, Addison–Wesley, 1994.

*Primary Examiner*—Chau Nguyen
*Assistant Examiner*—Chiho Andrew Lee
*Attorney, Agent, or Firm*—Lee, Mann, Smith, McWilliams, Sweeney & Ohlson

[57] ABSTRACT

A method of predicting at least one future value of a time series of data using a neural network comprising the steps of:

(I) inputting a plurality of values of the time series into the neural network;

(ii) inputting information about a time into the neural network; and (iii) obtaining outputs from the neural network said outputs comprising predicted future value(s) of the time series.

15 Claims, 5 Drawing Sheets

FORMAT FOR RAW (UNPROCESSED) DATA

| QUANTITY $X_{(t)}$ | TIME(yyyy mm dd hh mm) | ANCILLARY VARIABLE |
|---|---|---|
| 2000 | 1996 01 01 7 00 | 6 |
| 3500 | 1996 01 01 7 30 | 8 |
| 5000 | 1996 01 01 8 00 | 9 |
| 7000 | 1996 01 01 8 30 | 11 |
| 12000 | 1996 01 01 9 00 | 14 |
| 17000 | 1996 01 01 9 30 | 15 |
| 15000 | 1996 01 01 10 00 | 18 |

*Fig. 5*

FORMAT FOR INPUT DATA FOR PREDICTION BUFFER

| QUANTITY $X_{(t+1)}$ | TIME(yyyy mm dd hh mm) | ACCURACY |
|---|---|---|
| 15320 | 1996 01 01 11 30 | 32 |
| 17572 | 1996 01 01 12 00 | 41 |

*Fig. 6*

METHOD AND APPARATUS FOR FORECASTING FUTURE VALUES OF A TIME SERIES

BACKGROUND OF THE INVENTION

1. Field of the Invention

This invention relates to a method and apparatus for forecasting future values of a time series and particularly for forecasting future values of a time series relating to traffic levels in a communications network.

2. Description of the Prior Art

One approach to the task of trends analysis and making predictions has been to use neural network technology. For example, neural networks have been used to forecast aspects of the financial markets and also in many other situations in which it is required to forecast the future development of a time series. A time series is a sequence of values that are measured over time, typically at fixed time intervals. For example, this could be the temperature of air in a building over time, the number of births in a given city over time, the number of sun spots over time or even the amount of water consumed in a given community. In practice time is usually viewed in terms of discrete time steps, leading to an instance of the temperature of the air (for example) after each of a number of time intervals.

There are a number of problems involved in using neural network technology to predict the future development of a time series. A first problem is how to supply the temporal information to the neural network. Since most neural networks have previously been defined for pattern recognition in static patterns the temporal dimension has to be supplied in an appropriate way. Other problems include the requirements for large data bases of information with which to train the neural network and also the need for careful evaluation of the trained neural network. Both these requirements often prove costly and time consuming. A further problem relates to limitations of the learning algorithms used to train the neural networks. Poor learning algorithms lead to lengthy training times and poor performance of the neural network once it is trained. For example, the neural network may "over fit" the data so that its ability to generalise and cope with previously unseen data is limited. Also, the neural network may simply learn to detect noise in the data rather than more meaningful and useful information.

One application of neural networks to predict time-series development relates to asynchronous transfer mode (ATM) communications networks. ATM technology offers a great flexibility of transmission bandwidth allocation. Using this technology the amount of bandwidth allocated for a particular use can be altered. In order to make good use of this ability it is necessary to predict future bandwidth requirements in order that the amount of bandwidth can be adjusted to meet this future requirement. The prediction process must be able to ensure sufficient bandwidth to provide quality of service for a particular task, whilst at the same time minimising over prediction of bandwidth requirements. This enables the maximum amount of remaining bandwidth to be available for other services. For example, one problem is the prediction of voice traffic on ATM communication networks. In this situation, as much bandwidth as possible should remain at any one time for other services such as video transmission. This is illustrated in FIG. 7.

For predicting voice traffic levels in ATM networks there are several specific problems. For example, relatively short-term prediction must be possible, such as providing an estimate of traffic levels 15 minutes in advance. Also, there are many characteristics of telecommunications traffic that lead to problems specific to this area. For example, one of the characteristics of telecommunications traffic is the superimposition of many cyclical effects which can have different periodicities. For instance, there are hourly trends corresponding to the business day, daily trends (some working days are typically busier than others and weekends have very little traffic), monthly trends and seasonal trends. This means that the prediction process must be able to cope with these cyclical effects as well as underlying trends in the data. One known approach to this problem is to de-trend the data by working out what the periodicities of the cyclical effects are and what is the average effect from each of these influences. The trend(s) are then removed and prediction made on the resulting data. However this is a time consuming and complex process which also leads to inaccuracies in the predictions. Telecommunications is a fast growing area in which traffic behaviour is continually evolving and changing. The prediction process also needs to cope with this evolution as well as interactions between the various effects.

Another problem relates to the early identification of problems in communications networks, and especially ATM networks. ATM networks produce a continually varying and often heavy stream of alarms and other symptomatic information. In this situation it is required to identify when a sequence of events is indicative of an incipient, major component of failure.

A further problem relates to customer network management. Customers who make extensive use of a service providers network are often provided with a "virtual private network". This enables them to control part of the service providers network under a "service level agreement". The service level agreement typically specifies the bandwidth levels that the customer is allowed to use. If this bandwidth level is exceeded at any time by the customer, data can effectively be "lost". However, it is very difficult for the customer to predict bandwidth requirements in advance in order to negotiate for a larger bandwidth when this is required.

It is accordingly an object of the present invention to provide a method and apparatus for forecasting future values of a time series and particularly for forecasting future values of a time series relating to traffic levels in a communications network which overcomes or at least mitigates one or more of the problems noted above.

SUMMARY OF THE INVENTION

According to a first aspect of the present invention there is provided a method of predicting at least one future value of a time series of data using a neural network comprising the steps of:

(I) inputting a plurality of values of the time series into the neural network;

(ii) inputting temporal information relating to the said inputting of values of said time series of data into the neural network; and (iii) obtaining outputs from the neural network said outputs comprising predicted future value(s) of the time series.

A corresponding computer system for predicting at least one future value of a time series of data comprises (I) a neural network;

(I) a first input arranged to accept a plurality of values of the time series into the neural network;

(ii) a second input arranged to accept temporal information relating to the said inputting of values of said time series of data into the neural network; and (iii) an output arranged to provide outputs from the neural network said outputs comprising future value(s) of the time series. This provides the advantage that predicted future value(s) of the time series are obtained. These predictions can then be used for decision making and allocation of resources as well as for other purposes. Because information about time is input to the neural network then the predicted values match the actual values well, especially for applications where the time series incorporates many cyclical effects which have different periodicities. Including the time information also removes the need for the input data to be "detrended" prior to its use. That is information about cyclical or other superficial trends on the data does not need to be removed before the data is input to the neural network. Nor does this information need to be recombined with the outputs of the neural network.

Preferably the information about said time comprises information about a current time. This enables the predicted values produced by the method to match the actual values more closely, especially for applications where the time series incorporates many cyclical effects which have different periodicities.

It is also preferred that the information about said time is input to the neural network in the form of at least one pair of values which relate to an angle. This has the advantage that the number of inputs to the neural network, that are required for the time information, is relatively low. This also enables the neural network to be trained quickly and to give better generalisation performance. Also the cyclical nature of the time information is captured and represented well by the pair of values which relate to an angle. This information about the cyclical nature of the time information enables more accurate predictions to be made using the method.

Advantageously, said pair of values comprise the sine and cosine of said angle. This enables the time information to be represented as a position on the circumference of a circle. The cyclical nature of the time information is easily accessible using this form of representation.

Preferably the method further comprises the step of inputting to the neural network at least some of said outputs from the neural network. This provides the advantage that recursive prediction can be carried out. For example, if the method provides a prediction of the value of the time series in 15 minutes time then in order to obtain a prediction for 30 minutes in the future then the first prediction is used as input to the neural network.

It is also preferred that the method further comprises the step of inputting one or more ancillary variables into the neural network. This provides the advantage that the predictions are improved by making use of further information. For example, if the time series relates to the temperature in a room over time, then an ancillary variable could be the temperature outside the room. By providing this ancillary information to the neural network better predictions can be obtained especially when there is a good correlation between the ancillary variable and the variable(s) being predicted.

The invention is especially useful when said time series of data comprises information relating to bandwidth levels in an asynchronous transfer mode telecommunications network. This provides the advantage that future bandwidth requirements can be predicted in order that the amount of bandwidth can be adjusted in time to meet this future requirement. This enables the maximum amount of remaining bandwidth to be available for other uses whilst at the same time ensuring sufficient bandwidth to provide quality of service for a particular task.

According to a third aspect of the present invention there is provided a computer system for predicting at least one future value of a time series of data relating to a communications network, said communications network comprising a communications network management system and said computer system comprising:

(i) a neural network;

(ii) an input to the neural network arranged to automatically accept values of the time series from the communications network management system; and (iii) an output from the neural network arranged to provide future value(s) of the time series to the communications network management system. This provides the advantage that the computer system is embedded or integrated into the communications network management system. In this way the computer system receives inputs automatically and its outputs are dealt with by the communications network management system. For example, if the computer system predicts bandwidth levels for an asynchronous transfer mode telecommunications network then the outputs of the computer system can be used to adjust bandwidth allocations automatically, without the need for intervention by a human operator.

According to a fourth aspect of the present invention there is provided a method for predicting at least one future value of a time series of data relating to a communications network, said communications network comprising a communications network management system, said method comprising the steps of:

(i) automatically inputting one or more values of the time series into the neural network from the communications network management system;

(iii) obtaining outputs from the neural network said outputs comprising future value(s) of the time series and automatically providing said outputs to the communications network management system. This provides the advantage that the method is carried out automatically in conjunction with a communications network management system. For example, if the method predicts bandwidth levels for an asynchronous transfer mode telecommunications network then the outputs of the method can be used to adjust bandwidth allocations automatically, without the need for intervention by a human operator.

BRIEF DESCRIPTION OF THE DRAWINGS

FIG. 5 shows input data for the arrangement of FIG. 2.

FIG. 6 represents information contained in the output from the arrangement.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
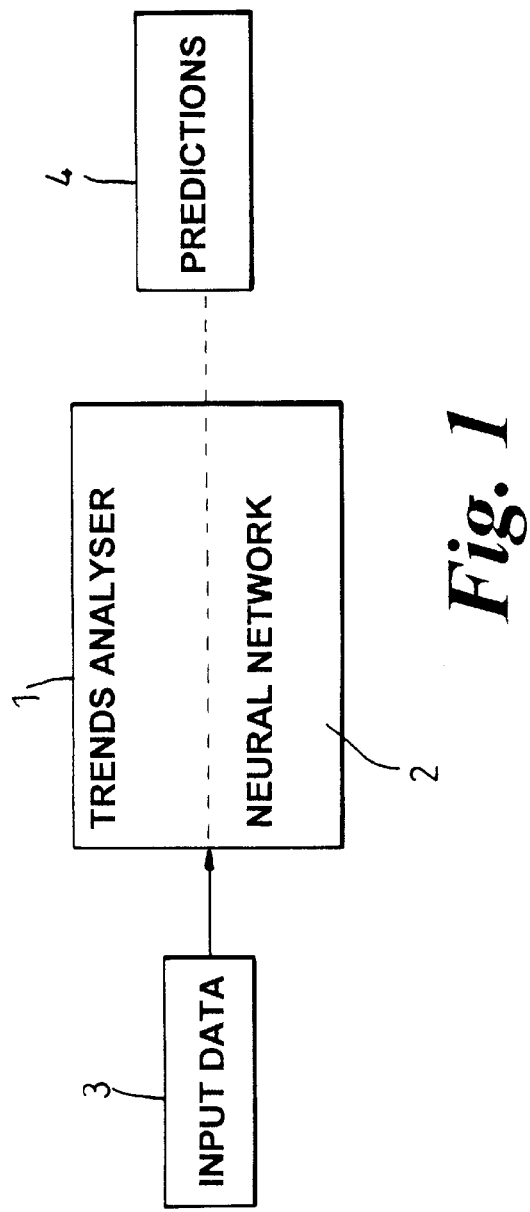
FIG. 1 a general schematic diagram of an arrangement for predicting future values of a time series.

As shown in FIG. 1 a trends analyser 1 is provided which incorporates a neural network 2. Input data 3 is input to the trends analyser 1 which produces predictions 4. These predictions 4 are in the form of predicted future value(s) of a time series.

The input data 3 comprises values of the time series. These values comprise past and/or present values of the time series and may also comprise predicted values of the time series as described below. For example, the time series could relate to the temperature in a room over time, and the input values could be the temperature in the room at the current time, the temperature 15 minutes ago, and the temperature 30 minutes ago. The time series values are usually univariate values, although it is also possible to use multivariate values. For example, a multivariate time series could be pairs of values of the air temperature and the consumption of water over time.

The input data 3 also comprises information about a time. For example this could be the current time or perhaps a future time. The term time is used to include information about the date as well as the time of day. This means that the information about time may also comprise information about the day of the week for example. By including information about time in the input data 3 the predicted values 4 produced by the trends analyser are improved. This is especially the case for applications where the time series incorporates many cyclical effects which have different periodicities.

The information about time that is included in the input data 3 can be provided in many different formats. Another way to express this is to say that a representation of time is provided in the input data 3. The term representation is used to mean a description of an item together with a method or set of rules for interpreting the description. For example, time information can be represented using the 24 hour clock system, or alternatively as the number of seconds that have elapsed since a certain point. These different representations will be suitable for different tasks. For example, the representation in seconds is more suitable for calculating a duration in seconds than the 24 hour clock system would be. The time information included in the input data 3 is preferably represented using a sine/cosine encoding scheme. This scheme is described in detail below. Using this representation provides several advantages. For example, the number of inputs to the neural network, that are required for the time information, is kept to a low level. This also enables the neural network to be trained quickly and to give better generalisation performance. A further advantage is that the representation elucidates the cyclical nature of the time information and this enables more accurate predictions to be made using the method.

It is also possible for the input data 3 to comprise information about one or more ancillary variables although this is not essential. For example, if the time series relates to the temperature in a room an ancillary variable could be the temperature outside the room. This can improve the performance of the trends analyser 1 especially when the ancillary variable is well correlated with the time series variable(s).

The trends analyser 1 predicts future value(s) of the time series. For example, the output could be one value that is a prediction of room temperature in 15 minutes time. Alternatively, two or more output values could be provided to predict the temperature in say 15 minutes time, 30 minutes time and 1 hours time.

Figure 2:
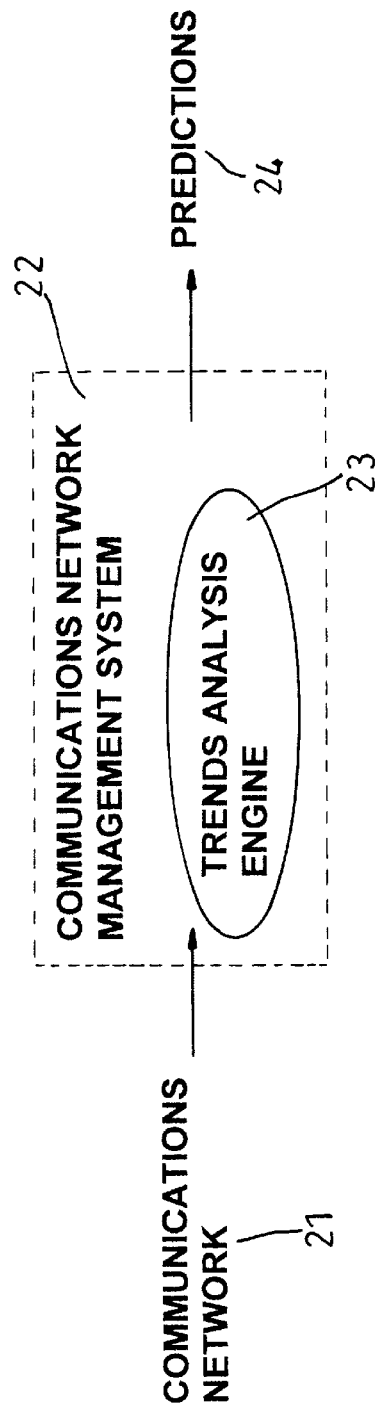
FIG. 2 shows the arrangement used to forecast future values of a time series relating to a communications network, where the arrangement is embedded in communications network management software.

As shown in FIG. 2 the trends analyser 1 is formed from a trends analyser engine 23 that is embedded in communications network management software 22. In this situation the input data 3 is provided from a communications network 21, and predictions 24 are produced by the trends analysers engine 23. By embedding the trends analysers engine in this way, the engine 23 receives inputs automatically from the communications network management system. The predictions 24 are output to the management system 22 which is able to make use of these predictions. For example suppose that the communications network 21 is an ATM telecommunications network and the trends analysers engine 23 predicts bandwidth levels for a particular service provided by the ATM network. Information about previous and current bandwidth levels can be provided to the engine 23 automatically by the management system 22. The predicted bandwidth requirements 24 can then be used by the management system 22 to adjust bandwidth allocations in time to meet future requirements. This is done without the need for intervention by a human operator. The inclusion of time information in the input data 3 makes the trends analysis engine 23 more suitable for embedding into a host system.

It is not essential for the trends analysis engine 23 to be embedded in the network management system 22. It is also possible for the trends analysis engine 23 to be formed as a stand alone application as shown by the trends analyser 1 in FIG. 1.

The term "communications network" is used to refer to any type of system in which information is passed between entities. For example, this could be a number of computers that are linked by cables, a mobile telephone network or a telegraph system. The term "telecommunications network" is used to refer to any communications network that is suitable for telephony.

The trends analysers engine 23 is initially provided as a library of software components. These software components are used to create a particular instantiation of a trends analysis engine 23 that is suitable for a particular application. The trends analysis engine 23 is generic when in the form of the library of software components. That is, the library of software components are suitable for a number of different trends analysis tasks involving different types of input data, different output requirements and different numbers of ancillary variables. The library of software components are used to create a particular example of a trends analyser in which the configuration of the neural network 2 is formed so as to be suited for the task involved. The generic engine can be used to form either an embedded or a stand alone trends analyser. The generic trends analysis engine 23 can be applied "cross-product" and "cross-data layer". Cross-product means that the trends analyser can be applied to more than one type of telecommunications network. Cross-data layer means that the trends analyser can be applied to data gathered from various layers of a telecommunications network. This is especially useful for ATM (Asynchronous Transfer Mode) networks and SDH (synchronous digital hierarchy) networks.

As shown in FIG. 1 the trends analyser incorporates a neural network 2. The neural network is preferably a multi layer perceptron type network that is feed-forward. A feed-forward neural network is one in which every unit (including the input units) feeds only the units in the next layer. That is, there are no connections leading from a unit to units in previous layers.

Figure 3:
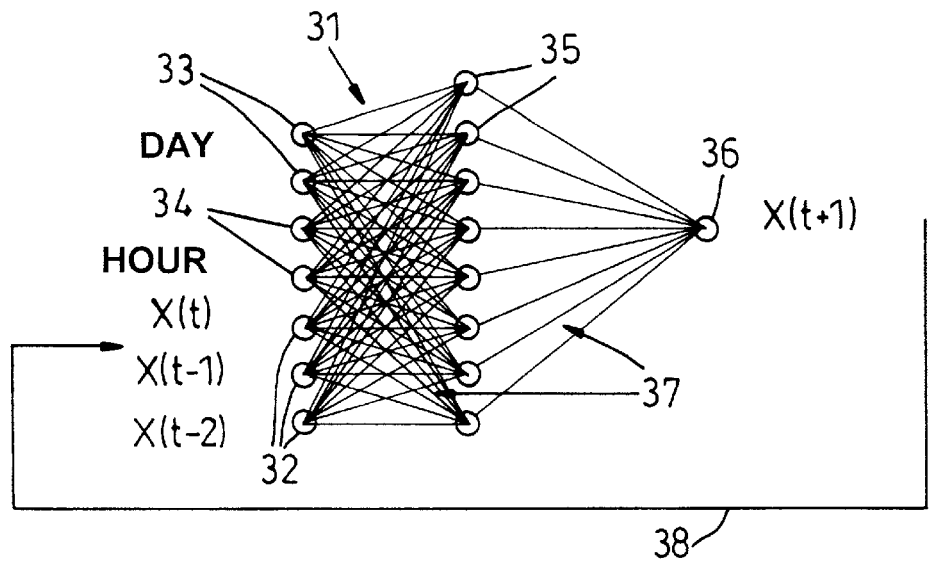
FIG. 3 is a general schematic diagram of a neural network for use in the arrangement of FIG. 2.

FIG. 3 is a schematic diagram of this type of neural network. Input units 32 are provided and a layer of hidden units 35. Every input unit 32, 33, 34 is connected to every hidden unit 35 via connections. Each hidden unit 35 is then connected to an output unit 36.

In the example shown in FIG. 3, input units 32 are used for input data 3 that comprises previous values of a time series. X indicates a time series value and t is a particular time, say the current time. In this example, three time series values are provided as input 32 to the neural network and these values are for the current time, the current time minus 1 and the current time minus 2. These time series values should be sampled at substantially regular intervals. Information about time is also input to the neural network. Input units 33 are used to input information about the current day of the week, and input units 34 for information about the current hour.

The neural network such as that shown in FIG. 3 is first trained using a set of training data. The connections 37 between the units are weighted connections such that the inputs to the neural network became modified by these weighted connections, as they pass through the network to produce outputs at the output units. During the training process the weights for the connections 37 in the network are modified in such a way as to produce outputs that are close to the expected outputs. The training process is described further below.

In the example shown in FIG. 3, after the neural network has been trained input data is provided to the input units 32, 33, 34 and an output is produced at output unit 36. The output comprises a predicted time series value for time (t+1) in this example. However, the predicted value could be for any time in the future. It is also possible to use a neural network 31 that has more than one output unit. For example, two outputs could provide predicted time series values for time (t+1) and (t+2). It is not essential to use the exact number of input units 32,33,34, hidden units 35 or output units 36 as shown in FIG. 1. Also different numbers of hidden layers can be used. Also it is not essential for every input unit 32,33, 34 to be connected to every hidden unit.

FIG. 3 also illustrates that the neural network can be used for recursive prediction. In this situation, information from an output unit 36 is fed back into the neural network 31 as an input. This is indicated by arrow 38 in FIG. 3. In this situation the time series values that are input to the neural network are sampled at a regular time interval, such as 15 minutes. The output value that is to be used as an input for recursive prediction should be suitable for this 15 minute interval. For example, in this situation the output value of x for time (t+15) minutes must be used, in order for this value to be a suitable input.

Figure 4:
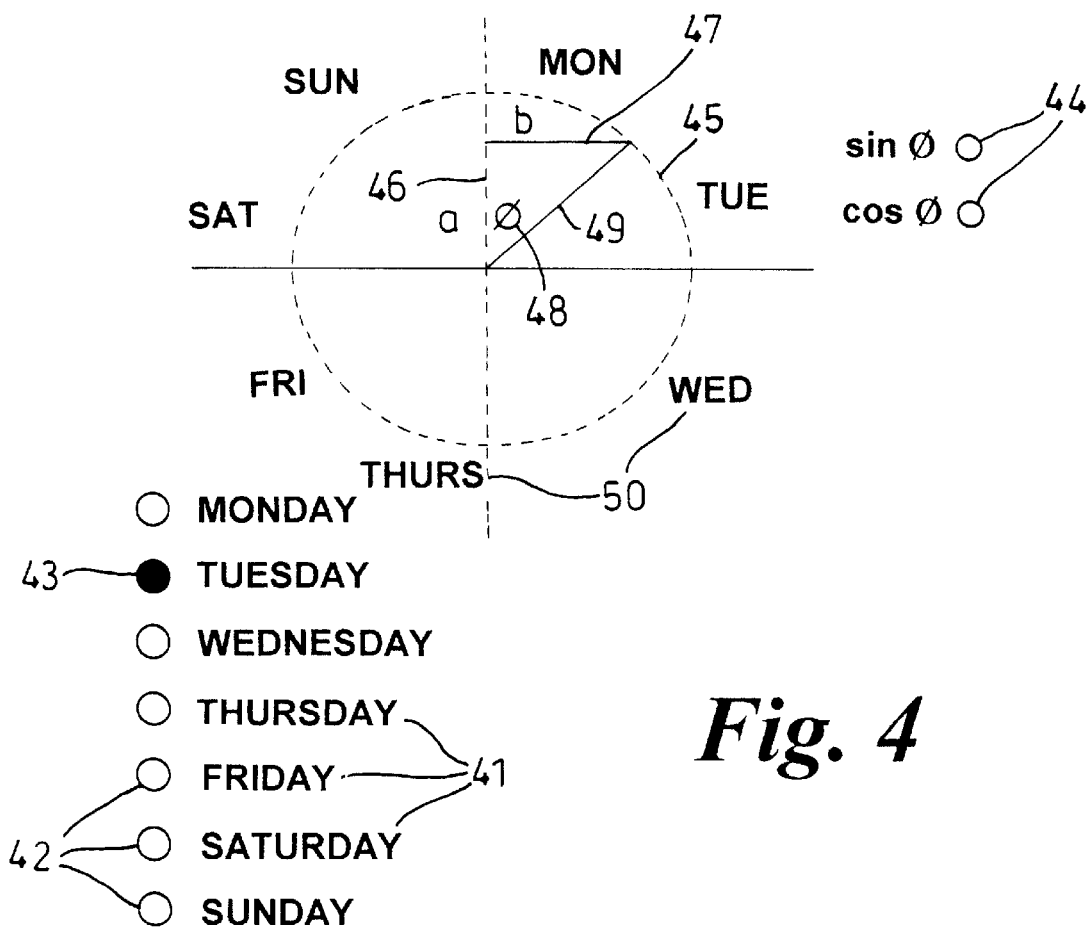
FIG. 4 indicates a sine/cosine encoding scheme for use in the arrangement of FIG. 2.

The time information that is input to the neural network 33, 34 is represented using a sine/cosine encoding scheme as mentioned above. In this scheme a pair of values that are the sine and the cosine of an angle is used to represent a particular type of time information. For example, this could be the day of the week, the hour of the day or the month of the year. Pairs of input units 33, 34 are then used for the time information. FIG. 4 illustrates how the sine/cosine encoding scheme works. In this example day of week information is represented. The days of the week 50 are represented as points on the circumference of a circle 45 as shown. For a particular day a radius can be drawn from the centre of the circle to the point representing that day. This is shown for Monday in FIG. 4. A base line 46 is defined and the angle 48 between the radius 49 and this base line is calculated. The sine of this angle specifies distance b in FIG. 4 and the cosine of the angle specifies distance a. These distances a and b can be thought of as co-ordinates which specify the location of the point on the circumference which represents the particular day. In this way the pair of sine and cosine values can be used to specify a day of the week. Similarly, other types of time can be represented in this way by changing what the points on the circumference of the circle refer to.

An alternative scheme for representing time information is also shown in FIG. 4. Here 7 units 42 are used one for each day of the week 41. This is a one-bit encoding scheme where each of the 7 units 42 can either be off or on. For example to represent Tuesday, the unit 43 is turned on as shown. Compared with the sine/cosine encoding scheme this is disadvantageous because the number of input units required is 7 rather than 2. This reduces the ability of the neural network to generalise since it does not show the relationships between similar time information. For example, indicating that Monday is closer to Tuesday than Friday. Another disadvantage is that the length of time required to train the network is increased.

The way in which the neural network 2 component of the trends analyser 1 is trained and evaluated is now described in more detail. As the performance of the neural network deteriorates over time it is also necessary to retain the neural network 2. For example this happens when the nature of the input data changes over time. This occurs often, especially for telecommunications applications, where the patterns of use are continually evolving.

Initial training is done from a random starting position i.e. the weights in the neural network are either randomly set or all set to the same value. In contrast retaining is done from the starting position of the trained engine. In this case the weights in the neural network are updated to take account of new data.

In a preferred example, the trends analyser 1 is written in an object-oriented programming language such as C++. Successful training or retraining returns a C++ object called a neural network specification which contains information about the set of weights in the neural network.

The neural network 2 is trained by presenting a set of training data to the neural network and modifying the weights associated with the connections 37 according to a learning rule or algorithm. In a preferred example a scaled conjugate gradient type learning algorithm is used although back-propagation type rules could also be used.

The training data set should ideally be a representative sample of historical data (i.e. past values of the time series). In the example of predicting voice traffic levels in a telecommunications network the training data set ideally contains a spread of traffic data for all situations where the user wishes the predictor to work. Typical as well as unusual data should be included. However, it is also desired to reduce the level of noise in the training data set as far as possible. This helps to ensure that the neural network does not learn to detect noise where the term noise refers to any random variation in the data.

Data is collected to form the training data set. For example FIG. 5 shows one possible format for the training data. The first column 51 shows a quantity Q which can be the number of voice circuits in a telecommunications network. The second column 52 shows the times at which each quantity value was obtained and the third column 53 contains the value of an ancillary variable. The data is collected in chronological order with a fixed time interval between samples. The size of this time interval is chosen according to the requirements of the prediction task and the particular application involved. The training that takes place is supervised training in that for each training data input, the desired output is known. When training the trends analyser 1 automatically validates its performance. It does this by randomly selecting a portion of the training data to check against whilst training. This has two effects—it stops over training (where the engine learns the particular data set too well and loses its ability to generalise) and it shortens the length of time that training takes.

After the engine 23 has been trained it is used to make predictions by presenting further input data. During the prediction phase, the engine 23 monitors its performance to determine when retraining is required. This is done by comparing recently presented input data against data from the training set. When the difference is significant, according to a predefined criterion or threshold, then retraining takes place.

Retraining involves making a copy of the trends analysis engine 23 incorporating the neural network and retraining the copy. After retraining has taken place the performance of the copy (or daughter engine) is validated. If validation is successful then the original engine is replaced by the daughter engine. This enables the original engine to be used whilst retraining takes place. The daughter can be moved to a quiet node in the network for retraining. Also, if retraining is unsuccessful, no damage is done to the original engine. Retraining takes place using the same algorithm as for training although an updated training data set us used which contains more recent examples.

The output of the neural network 4 comprises predictions as well as a measure of the accuracy of each prediction. For example, FIG. 6 shows information contained in the output. This includes a predicted quantity 61 together with an associated time at which this quantity is predicted, and also an associated accuracy value. The accuracy value is in the same units as used for the quantity value 61 and indicates a range for the predicted quantity value. In this example the quantity 15320 is said to be accurate to within 15320+/−32.

This accuracy value is determined using any suitable conventional method. For example, using an average value of error over a recent time interval. Alternatively, the prediction can be treated as a maximum of an assumed probability density function and the error determined using a required level of confidence.

Because the trends analyser 1 is based on neural network technology it has the following beneficial attributes:

Accuracy—predictions using neural network engines have been shown to outperform multi-variate discriminant analysis, autoregressive integrated moving average, and autoregressive moving average.

Robustness—neural networks are more resilient than standard statistical techniques to noisy training data.

Maintainability—neural network technology only requires the engine to be periodically retrained in order to keep performance within an acceptable level.

Development time—a library of software components is provided so that development time is minimal.

Speed—using the neural network in prediction mode takes about 0.01 sec.

Portability—the engine is applicable cross-product and cross-data-layer and can be implemented on a wide variety of platforms from PCs to workstations.

As well as a neural network component 2 the trends analyser 1 also comprises administrative components. The administrative components provide the capability to initially create and then maintain the engine. Maintenance of the engine comprises training the neural network component 2 and retraining when necessary.

As already mentioned, the trends analysis engine 23 is initially provided as a library of software components. Once the components have been put together they can be integrated with other system software via a simple C++ Application Programming Interface (API) or instantiated as a stand alone application.

The API comprises a trends analysis interface object (referred to as the TAIInterface object) which provides C++ methods (ways of communicating with the engine) each of which usually has an associated valid "return event" method. The user must inherit from this object and overload the return event methods to add the behaviour required by a specific application. This is described further in Appendix A.

An example of the steps required in order to instantiate a trends analysis engine 23 for a specific application is now described. In this example the trends analyser 23 is used to predict a reserved bandwidth for public network voice traffic. The aim is to:

achieve reliable voice transmission in an ATM environment with a predictable grade of service and release unused bandwidth for other services.

Predictions are required for inter-location traffic, i.e. traffic that travels from local exchange A to local exchange B. By predicting traffic between each location pair the traffic over each link can be calculated (by additional integration software) and the correct amount of bandwidth allocated for each link a short time before it is required. Bandwidth allocation updates are done every 10 minutes.

The requirement is that predictions are made every 10 minutes. The data collection requirement is therefore every 10 minutes (or finer granularity). Prediction accuracy must be within the range 0–10%.

Figure 7:
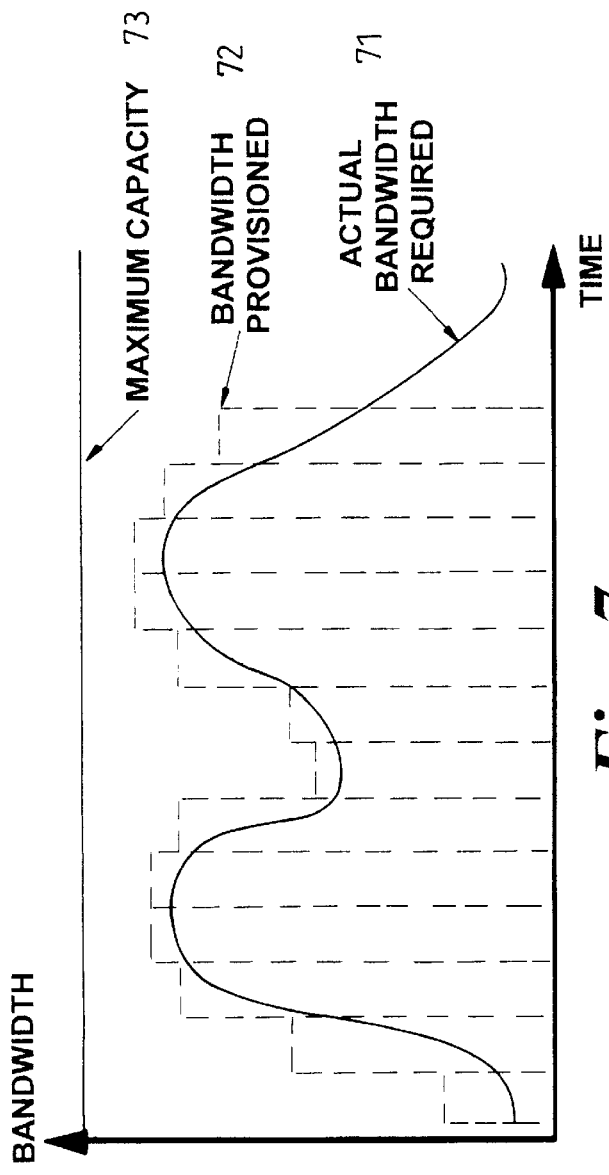
FIG. 7 is a graph of bandwidth required for a telephony service against time.

FIG. 7 shows the actual bandwidth required 71 on a typical day for telephony service and the bandwidth provisioned 72 from predictions made by the trends analysis engine. The bandwidth provisioned 72 is an envelope based on the prediction plus a 5% safety margin to accommodate small fluctuations in traffic for each ten minute interval.

In order to determine the predictability of data and the amount of random noise it is necessary to capture some sample data for analysis. The data must be collected at the same granularity as the prediction to be made.

The number of previous values of the time series to be input into the engine is determined as described in detail later in this document.

Brief visual inspection of the data capture for analysis and experience of the way traffic profiles vary indicates that the voice profile varies according to the time of day, day of week, day of month and month of year.

The next stage is to create the trends analysis engine 23 including the neural network component 2. To create the engine 23 one of the 6 methods of the API is called. This create method requires a trends analyser specification to be provided which specifies things such as the number of inputs that the neural network should have. This specification is described in more detail in Appendix A. In this example the number_of_ancillary_variables was determined to be 0, recall_window_size was determined to be 4, and the data_log_window_size was set to 5. Once the user has decided upon the details for the specification, this is created by calling the constructor on the Trends Analyser Specification object (see Appendix A).

A training data set is formed, updated and maintained by the communications network management system 22. The engine 23 is then trained by calling one of the 6 methods of the API (TrainTrendsAnalyser).

Once the trends analyser has been trained then it is ready to be used for prediction. The first task is to fill a prediction buffer with enough data to make the prediction. Data items are added one at a time from the data source. Extracting this data from the source is the responsibility of the communications network management system 22.

The AddInputPresentation method (see appendix A) is called as many times as the number of previous values of the time series that are required to make predictions. The usual mode of operation for the engine 23 is to make predictions. A new data item is input, the prediction made and then the prediction data deleted. It is the responsibility of the communications network management system 22, or integration software to copy the prediction and delete the prediction from the engine. A prediction is generated by calling the method MakePrediction.

In this example, the number of recursions is set to 1. This is because the engine is required to predict only one time-step ahead. This time-step is ten minutes ahead which is all that is required for this application.

The return event has the prediction data. This is passes out as a set because there may be more than one data item passed out. A single accuracy measure is passed out which is the Mean Square Error over the window of recent predictions held in a log of recent predictions and actual values.

Recursive Prediction

As described earlier it is possible to use outputs from the trends analyser 1 as inputs to the analyser 1 in order to make further predictions. However, ancillary variables which are available for real data are not available when using predictions as real data inputs to make further predictions. Ancillary variables should only be used where a single prediction is to be made. However, if it is required to use ancillary variables to make multiple predictions then the following options are available:

ancillary variable for all predictions into the future are assumed to be constant at the value of the last measurement;

a number of trends analysers 1 are instantiated and each predict 1,2,3 etc. time-steps ahead;

ancillary variables are not used in the prediction.

Variable length predictions are possible using a single trends analyser with additional processing in the integration layer. For example, a trends analyser may be set up to predict every quarter of an hour. The user however has the option of predicting any multiple of this time-step ahead. It is therefore possible to create integration software which aggregates multiple predictions in to a single value. This would actually be a multiple prediction but would appear as a single predictions many time-steps into the future.

Calculating the Number of Previous Values of the Time Series That are Required to Make Predictions An example of forecasting future values of a time series relating to the amount of voice traffic between two local exchanges in a telecommunications network is now briefly described. In this example, a neural network system was used to make the predictions. This system was a trends analyser 1 as described in the rest of this document. The trends analyser was linked to a host communications network management system and 1339 time series points were used. In order to determine the number of previous values required to make the forecast the following steps are carried out:

1. Obtain a sequential series of values of the amount of voice traffic at equi-spaced time intervals. For example, these could be x(0), x(1), x(2), x(3), x(4), x(5), . . . x(1339).

2. Form vectors of size 2 from these values. For example, the vectors could be:

S(0)=[x(0), x(1)]
S(1)=[x(1), x(2)]
S(2)=[x(2), x(3)] . . .
S(1339)=[x(1338), x(1339)]

3. Calculate the similarity between all possible pairs of these vectors. For example, similarity can be calculated as the Euclidean distance between 2 vectors. It is not essential to use Euclidean distance as a measure of similarity. Other types of similarity measure could be used.

Figure 8:
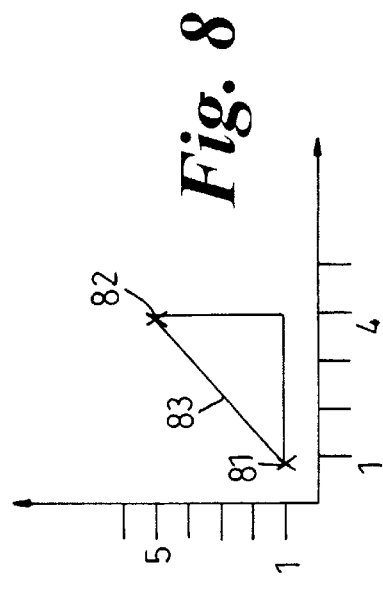
FIG. 8 shows how the Euclidean distance between two vectors is calculated.

For the two vectors (1,1) and (4,5) the Euclidean distance is 5 as shown in FIG. 8. Vector (1,1) is represented at point 81 and vector (4,5) at point 82. The distance between these points 81, 82 is labelled 83 in FIG. 8 and is 5 units. Distances are calculated in this way for all vector pairs. For example, S(0) and S(1); S(0) and S(2); and S(1) and S(2).

4. For each vector, find its neighbour. That is, for each vector another vector is chosen for which the Euclidean distance is least. This other vector is referred to as a neighbour.

5. Perform step 2 of this method again but this time for a vector size of 3 for example. In this case example vectors would be:

S(0)=[x(0), x(1), x(2)]
S(1)=[x(1), x(2), x(3)]
S(1)=[x(2), x(3), x(4)]

6. For the vectors of size 3, calculate the similarity between all possible pairs of these vectors using the same measure of similarity as for step 3. Then a second set of neighbours is determined as in step 4.

7. For a given vector (for example S(0)) there are a pair of corresponding neighbours, one from step 4 and one from step 6. Compare the two neighbours in each pair. If the neighbour from step 6 is "worse" than the neighbour from step 4 then these are false neighbours. How good a neighbour is is measured in terms of how close it is to its associated vector. In the present example, if the similarity measure for the neighbour from step 6 is poor in relation to the original similarity measure (step 4) then the neighbour is a false neighbour. Typically a predefined threshold is used to determine whether a similarity measure is poor.

8. Determine then the total number of false neighbours.

Figure 9:
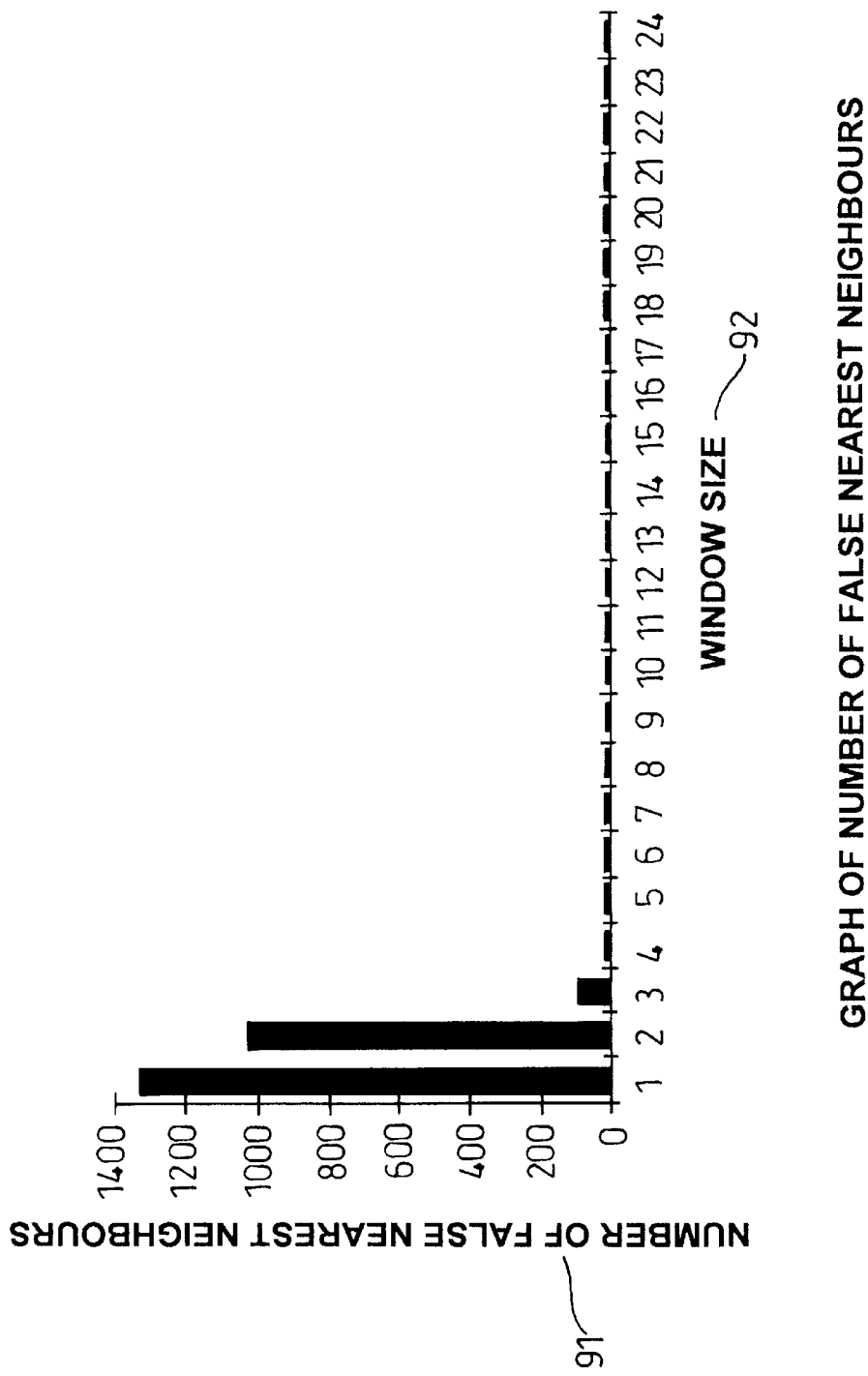
FIG. 9 is a graph of number of false neighbours against window size.

This method is repeated for larger vector sizes and a graph of total number of false neighbours 91 against vector size 92 is plotted as shown in FIG. 9. The vector size corresponds to the window size or number of previous values of the time series that are input to a prediction system. FIG. 9 shows how the number of false neighbours 91 declines dramatically reaching 11 by window size 4. After this the graph varies little. A window size of 21 reduces the number of false neighbours to 5 and a window size of 42 reaches 4. The graph of false neighbours against vector size is inspected and the first relatively low value of the vector size 92 is chosen as the number of inputs for the prediction process. For example, in FIG. 9, a vector or window size of 4 is indicated. With this number of previous values of the time series the trends analyser 1 performed well as a predictor for a set of training data and also produced good generalisation behaviour on unseen data.

The method or algorithm for determining the number of previous values of a time series required for forecasting is described in greater detail below.

The algorithm is based on analysing consecutive values of the input data to determine the correct window size. It works by taking one dimensional samples, Z(T) and combines sequential values together to form a multidimensional vector s of dimension d.

For example, for dimension d=2, the vectors S={s(0), s(1), . . . } can be formed from the sequential values as follows:

s(0)=[z(0), z(1)]

s(n)=[z(n), z(n+1)]

s(N−1)=[z(N−1), z(N)]

The theoretical results imply that with a sufficiently large value of d, the path of these vectors in $R^d$, is representative of the dynamics of the system, of which z is the observed variable. The goal is to find the smallest value of d that has this property. A nearest neighbour heuristic is used to ascertain a minimal value for d. The idea is that for each of the s(n) its nearest neighbour in S is found and the distance between the vectors recorded, as NearestNeighbourDistance (n,d). This distance is then recalculated for s(n) and its nearest neighbour but now with an incremental window size to give: NearestNeighbourDistance(n,d+1). If the difference between these two values is large in proportion to the original separation then they are judged as false nearest neighbours. Formally, when:

$$\frac{|\text{NearestNeighbourDistance}(n, d) - \text{NearestNeighbourDistance}(n, d + 1)|}{(\text{NearestNeighbourDistance}(n, d))} > R$$

s(n) is judged to have a false nearest neighbour. A suitable value for the threshold R lies in the range 10 to 50; preferably a value of 10 is used.

To find the appropriate window size then the number of false nearest neighbours for the whole training set is computed for incrementally increasing window sizes. When the number approaches zero the window size is fixed. At this point the dynamics of the system are represented with reasonable fidelity.

A wide range of other applications are within the scope of the invention. These include situations in which it is required to predict future values of a time series. For example, financial forecasting in stock markets, electric load forecasting in power networks, traffic predictions in transportation networks and fault prediction in process control. Other applications include call-admission control and link-capacity allocation in ATM networks. A further application is for customer network management, in situations where customers require to predict future bandwidth requirements in order to negotiate for extra bandwidth allocation from the service provider.

APPENDIX A

TAPrediction
    The TAPrediction contains a prediction value and the associated time.
    TAPrediction::GetPredictionValue
        float GetPredictionValue() const;
        Remarks
        Returns the prediction.
    TAPrediction::GetTimePredictionIsFor
        Time GetTimePredictionIsFor() const;
        Remarks
        Returns the time associated with the prediction.
DTDataSetSpecification
    DTDataSetSpecification is a place-holder for configuration information
    which is required for data transformations which take place within the TA.
    DTDataSetSpecification::DTDataSetSpecification
        DTDataSetSpecification(int no_of_ts_input_values, int
        no_of_ancillary_values, Bool month, Bool day_of_week, Bool hour, Bool
        minute, IncrementIntervalType increment_interval, int increment_step, int
        no_of_intervals_to_output, float normalisation_upper_bound, float
        normalisation_lower_bound);
        no_of_ts_input_values - This is the number of past values of the quantity
        to be predicted. A typical value for this would be 4. This value must be the
        same as recall_window_size in the TA Specification.
        no_of_ancillary_values - This is the number of inputs other than time and
        past values of the quantity to be predicted which effect the prediction. This
        value must be the same as number_of_ancillary_variables in the TA
        Specification.
        month - This is a boolean value indicating whether the data will vary on a
        monthly cycle.
        day_of_week - This is a boolean value indicating whether the data will vary
        on a day-of-week cycle.
        hour - This is a boolean value indicating whether the data will vary on a
        hourly cycle.
        minute - This is a boolean value indicating whether the data will vary on
        a minute-by-minute basis.
        increment_interval - This tells the engine which interval to increment (e.g.
        minutes)
        increment_step - This value tells the engine how much to increment the
        interval by (e.g. 30). Combining this parameter with increment_interval
        tells the engine how much to increment by (e.g. 30 minutes).
        no_of_intervals_to_output - This value tells the engine how many time-
        intervals the engine should predict into the future.
        normalisation_upper_bound - This value should be set to 0.0 as it is set
        automatically in the training/retraining phase.

APPENDIX A-continued

```
        normalisation_lower_bound - This value should be set to 0.0 as it is set
        automatically in the training/retraining phase.
        DTDataSetSpecification::IncrementIntervalType
        This is an enumerated type which can take the following values:
        enum IncrementIntervalType
        {
            MONTH,
            DAY,
            DAY_IN_WEEK,
            HOUR,
            MINUTE
        };
DTDataSet
        DTDataSet provides a container for training data which is in the correct
        format to be passed into the TA. The data set must contain at least one row
        as shown in FIG. 3-5.
FIG. 3-5 DTDataSet and Related DTRow(s)
```

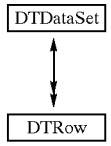

```
    DTDataSet::DTDataSet
        DTDataSet();
        DTDataSet(List_of_p<DTRow>* rows);
        rows - A list of pointers to rows.
        Remarks
        Creates a data set.
    DTDataSet::LinkR18Has
        LinkR18Has(DTRow* row_id);
        row_id - A pointer to a row.
        Remarks
        Adds a row to a data set.
DTRow
        DTRow provides a container for related information, i.e. time can be
        connected with data and ancillary variables within a row as shown in FIG.
        3-6. Many rows can be connected together within a data set. See
        DTDataSet.
        FIG. 3-6 DTRow and related DTDataItem(s)
```

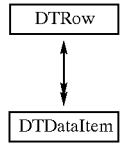

```
    DTRow::DTRow
        DTRow ();
        DTRow (int row_number);
        row_number - The row number within the data set.
        Remarks
        Creates a row.
    DTRow::LinkR5IsComposedOf
        LinkR5IsComposedOf(DTDataItem* data_item_id);
        data_item_id - Pointer to a data item.
        Remarks
        Adds a data item to a row. Data items should be added into a row in a
        specific order. Date and Time data items should always be the first data
        item of the row. This should be followed by a single data item for which
        the prediction is to be made. Finally the user can add as many ancillary
        variable data items as required. See DTDataItem.
DTDataItem
        DTDataItem is a place-holder for data. The data can be either the date and
        time information or a single data value. Many data items can be connected
        within a row. See DTRow.
    DTDataItem::DTDataItem
        DTDataItem (Time* time_values, int column_number);
        DTDataItem (float numeric_value int column_number);
        time_values - date and time information
        numeric_value - single data value
        column_number - position within a list of data items.
        Remarks
```

APPENDIX A-continued

Creates a data item.

NNNeuralNetworkCreationSpec
> The NN Creation Specification is the place-holder for the information contained in the neural network component (see also Chapter 0 "Library Dependencies").
> FIG. 3-7 shows the Neural Network Creation Specification which has relationships with two other objects which need to be constructed first. These two objects are the Layered Network Specification and Network Trainer Specification.

FIG. 3-7 Neural Network Creation Specification and Related Objects

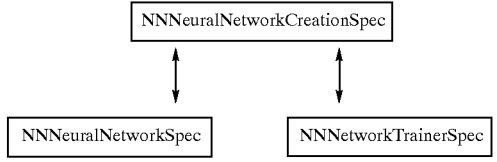

> NNNeuralNetworkCreationSpec::NNNeuralNetworkCreationSpec
> > NNNeuralNetworkCreationSpec(NNNeuralNetworkSpec*
> > network_spec_id, NNNetworkTrainerSpec* trainer_spec_id);
> > network_spec_id - Pointer to a network specification
> > trainer_spec_id - Pointer to a trainer specification
> > Remarks
> > Creates an NNNeuralNetworkCreationSpec.

NNNeuralNetworkSpec
> NNNeuralNetworkSpec is a super-type object for future expansion to support other types of neural networks. NNLayeredNetworkSpec is a sub-type and therefore can be substituted in place of the object NNNeuralNetworkSpec.

NNLayeredNetworkSpec
> The layered network specification has two constructors. It can be called by supplying an array of weight values (for a trained specification) or without any weight values (for an untrained specification).
> > NNLayeredNetworkSpec::NNLayeredNetworkSpec
> > NNLayeredNetworkSpec(List<int>& unit_numbers);
> > NNLayeredNetworkSpec(List<int>& unit_numbers, SWAArray& weights);
> > unit_numbers - A list of 3 integer values for:
> > - Number of units in input layer. This will be determined by the number of past values of the quantity to be predicted, the time periods it will vary over and the number of ancillary variables.
> > - Number of units in hidden layer. This will be determined by the topology optimization.
> > - Number of units in output layer. This should be set to 1.
> > weights - This is the value of each of the weights between the connections in the neural network. These are set during training/retraining. If a specification for a trained TA is being passed in then the weights must be included. If a specification for an un-trained TA is being passed in then no weights are necessary.

NNNetworkTrainerSpec
> The network trainer specification is the place-holder for the information contained in the neural network training component.
> > NNNetworkTrainerSpec::NNNetworkTrainerSpec
> > NNNetworkTrainerSpec (float target_error, unsigned int percentage_validation, Bool is_early_stopping_required, unsigned int number_of_training_cycles, long random_seed, unsigned int max_number_of_steps, float fractional_tolerance);
> > target_error - This is a stopping condition for training the TA, measured on the training data.
> > - A zero value disables this test. This is the usual value for this parameter.
> > - A non-zero value gives the error value[1] at which to stop training (if it has not stopped previously for some other reason).
> > percentage_validation - Only significant if is_early_stopping_required = TRUE. The percentage of training data that will be randomly chosen as validation data and hence will not be used for optimization.
> > is_early_stopping_required - A boolean value indicating if the neural network technique of early-stopping should be used to try to achieve generalization. In most cases this should be set to TRUE.
> > number_of_training_cycles - The number of times a TA is re-initialised and trained in order to find the best solution.
> > - A zero value requests re-training. That is a single training cycle starting from the previous weight values.
> > - A non-zero value gives the number of training cycles to carry out; randomizing the weights at the start of each training cycle. The network

APPENDIX A-continued returned is the one for the training cycle which achieved the best fit.
random_seed - This controls the seeding of a pseudo-random number generator used for initializing weights and choosing the validation set.
- A value of −1 causes the generator to be seeded from a value derived from the system clock; this maximizes the unpredictability of the generated numbers. This is the usual value for this parameter.
- A positive number is converted to an unsigned int (e.g; truncated to 32 bits) and this value used as the seed. This option is mainly intended for purposes such as regression testing and debugging where the same sequence of pseudo-random numbers may be required every time.

max_number_of_steps - This is another stopping condition for training as it limits the number of times the TA updates itself.
- A zero value disables this test. This is the usual value for this parameter.
- A non-zero value gives the number of steps at which to stop a training cycle (if it has not stopped previously for some other reason).

fractional_tolerance - The optimizer stops when its steps are no longer making significant progress (if it has not stopped previously for some other reason).
- A zero value indicates that a step should only be considered insignificant when it becomes small compared with the accuracy of the floating-point calculations. Often the level of fit achieved by this criteria does not merit the extra time the optimization requires.
- A non-zero value indicates the relative improvement a step must achieve to be considered significant. This can be used as a fairly simple way of reducing the time taken by the optimization without making a practical difference to the fit achieved. Values in the range $10^{-1}$ to $10^{-6}$ are suggested as a starting point for experimentation.

[1] Measured as the sum-of-squared errors over the training set.

What is claimed is:

1. A method of predicting at least one future data value of a time series of data using a neural network so as to manage resources in a communications network, the method comprising the steps of:
   (i) inputting a plurality of data values of the time series into the neural network;
   (ii) inputting, with said data values, time information relating to those values;
   (iii) obtaining outputs from the neural network said outputs comprising predicted future values of the time series based on said data values and on said time information; and
   (iv) allocating network resources corresponding to said predicted future values;
   wherein said step (i) of inputting a plurality of values of the time series into the neural network comprises the step of determining a number of values of the time series that are required to be input to the neural network, said step of determining a number of values comprising the steps of:
   (v) forming a set of first vectors wherein each first vector is the same size and each first vector comprises a number of sequential values of the time series;
   (vi) forming a set of second vectors, wherein each second vector is the same size, and each second vector comprises a number of sequential values of the time series, and wherein the first and second vectors are different sizes;
   (vii) for each first vector selecting another of the first vectors as a first neighbour where a first measure of similarity between each first vector and its first neighbour is less than a threshold value;
   (viii) for each second vector selecting another of the second vectors as a second neighbour where a second measure of similarity between each first vector and its second neighbour is less than a threshold value, and wherein each second neighbour corresponds to a first neighbour;
   (ix) determining the number of false neighbours by comparing each first neighbour with its corresponding second neighbour; and
   (x) determining the number of values that are required to be input to the neural network according to a first vector size for which a threshold number of false neighbours are obtained.

2. A method in claim 1 wherein the information about said time comprises information about a current time.

3. A method as claimed in claim 1 wherein the information about said time is input to the neural network in the form of at least one pair of values which relate to an angle.

4. A method as claimed in claim 3 wherein said pair of values comprise the sine and cosine of said angle.

5. A method as claimed in claim 1 which further comprises the step of inputting to the neural network at least some of said outputs from the neural network.

6. A method as claimed in claim 1 which further comprises the step of inputting one or more ancillary variables into the neural network.

7. A method as claimed in claim 1 wherein the values of said time series of data are univariant.

8. A method as claimed in claim 1 wherein said time series of data comprises information relating to a communications network.

9. A method as claimed in claim 1 wherein said time series of data comprises information relating to traffic levels in a telecommunications network.

10. A method as claimed in claim 1 wherein said time series of data comprises information relating to bandwidth levels in an asynchronous transfer mode telecommunications network.

11. A method as claimed in claim 1 wherein said step (i) of inputting a plurality of values of the time series into the neural network comprises the step of determining a number of values of the time series that are required to be input to the neural network.

12. Software in machine readable form on a storage medium for performing a method of predicting at least one future data value of a time series of data using a neural network so as to manage resources in a communications network, the method comprising the steps of:
  (i) inputting a plurality of data values of the time series into the neural network;
  (ii) inputting, with said data values, time information relating to those values;
  (iii) obtaining outputs from the neural network said outputs comprising predicted future values of the time series based on said data values and on said time information; and
  (iv) allocating network resources corresponding to said predicted future values;
  wherein said step (i) of inputting a plurality of values of the time series into the neural network comprises the step of determining a number of values of the time series that are required to be input to the neural network, said step of determining a number of values comprising the steps of:
    (v) forming a set of first vectors wherein each first vector is the same size and each first vector comprises a number of sequential values of the time series;
    (vi) forming a set of second vectors, wherein each second vector is the same size, and each second vector comprises a number of sequential values of the time series, and wherein the first and second vectors are different sizes;
    (vii) for each first vector selecting another of the first vectors as a first neighbour where a first measure of similarity between each first vector and its first neighbour is less than a threshold value;
    (viii) for each second vector selecting another of the second vectors as a second neighbour where a second measure of similarity between each first vector and its second neighbour is less than a threshold value, and wherein each second neighbour corresponds to a first neighbour;
    (ix) determining the number of false neighbours by comparing each first neighbour with its corresponding second neighbour; and
    (x) determining the number of values that are required to be input to the neural network according to a first vector size for which a threshold number of false neighbours are obtained.

13. A method for predicting at least one future data value of a time series of data relating to a communications network, said communications network incorporating a communications network management system arranged to allocate resources, said method comprising the steps of:
  (i) automatically inputting one or more data values of the time series into the neural network from the communications network management system, said data values having associated therewith time information relating to those values; and
  (ii) obtaining outputs from the neural network said outputs comprising predicted future value(s) of the time series based on said data values and on said time information, and automatically providing said outputs to the communications network management system so as to enable control of said resource allocation;
  wherein said step (i) of inputting a plurality of values of the time series into the neural network comprises the step of determining a number of values of the time series that are required to be input to the neural network, said step of determining a number of values comprising the steps of:
    (iii) forming a set of first vectors wherein each first vector is the same size and each first vector comprises a number of sequential values of the time series;
    (iv) forming a set of second vectors, wherein each second vector is the same size, and each second vector comprises a number of sequential values of the time series, and wherein the first and second vectors are different sizes;
    (v) for each first vector selecting another of the first vectors as a first neighbour where a first measure of similarity between each first vector and its first neighbour is less than a threshold value;
    (vi) for each second vector selecting another of the second vectors as a second neighbour where a second measure of similarity between each first vector and its second neighbour is less than a threshold value, and wherein each second neighbour corresponds to a first neighbour;
    (vii) determining the number of false neighbours by comparing each first neighbour with its corresponding second neighbour; and
    (viii) determining the number of values that are required to be input to the neural network according to a first vector size for which a threshold number of false neighbours are obtained.

14. A method as claimed in claim 13 further comprising the step of inputting temporal information relating to the said inputting of values of said time series of data into the neural network.

15. A communications network comprising:
  a communications network management system arranged to allocate resources;
  a computer system for predicting at least one future data value of a time series of data relating to the communications network; said computer system comprising:
  a neural network;
  an input to the neural network arranged to automatically accept values of the time series from the communications network management system, said data values having associated therewith time information relating to those values; and
  an output from the neural network arranged to provide predicted future value(s) of the time series based on said data values and on said time information to the communications network management system;
  wherein said computer system is arranged to compute the values of the time series input to the neural network by determining a number of values of the time series that are required to be input to the neural network, said step of determining a number of values comprising the steps of:
    (i) forming a set of first vectors wherein each first vector is the same size and each first vector comprises a number of sequential values of the time series;
    (ii) forming a set of second vectors, wherein each second vector is the same size, and each second vector comprises a number of sequential values of the time series, and wherein the first and second vectors are different sizes;

(iii) for each first vector selecting another of the first vectors as a first neighbour where a first measure of similarity between each first vector and its first neighbour is less than a threshold value;

(iv) for each second vector selecting another of the second vectors as a second neighbour where a second measure of similarity between each first vector and its second neighbour is less than a threshold value, and wherein each second neighbour corresponds to a first neighbour;

(vi) determining the number of false neighbours by comparing each first neighbour with its corresponding second neighbour; and (vii) determining the number of values that are required to be input to the neural network according to a first vector size for which a threshold number of false neighbours are obtained.

* * * * *